United States Patent
Benjamin et al.

(10) Patent No.: US 10,188,124 B2
(45) Date of Patent: Jan. 29, 2019

(54) TEA DRY MATTER COMPOSITIONAL BEVERAGE

(71) Applicants: UNILEVER PLC, London Greater London (GB); CONOPCO, INC., Englewood Cliffs, NJ (US)

(72) Inventors: Mia Claire Benjamin, Voorburg (NL); Jadwiga Malgorzata Bialek, Den Haag (NL); Pieter Versluis, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 168 days.

(21) Appl. No.: 14/651,754

(22) PCT Filed: Dec. 2, 2013

(86) PCT No.: PCT/EP2013/075221
§ 371 (c)(1),
(2) Date: Jun. 12, 2015

(87) PCT Pub. No.: WO2014/095324
PCT Pub. Date: Jun. 26, 2014

(65) Prior Publication Data
US 2015/0320070 A1 Nov. 12, 2015

(30) Foreign Application Priority Data
Dec. 19, 2012 (EP) .................................. 12198233

(51) Int. Cl.
A23F 3/00 (2006.01)
A23F 3/16 (2006.01)
A23F 3/14 (2006.01)
A23F 3/30 (2006.01)
A23L 2/52 (2006.01)
A23L 2/60 (2006.01)
A23L 2/66 (2006.01)

(52) U.S. Cl.
CPC .................. *A23F 3/16* (2013.01); *A23F 3/14* (2013.01); *A23F 3/163* (2013.01); *A23F 3/30* (2013.01); *A23L 2/52* (2013.01); *A23L 2/60* (2013.01); *A23L 2/66* (2013.01)

(58) Field of Classification Search
None
See application file for complete search history.

(56) References Cited

U.S. PATENT DOCUMENTS

| 4,923,981 | A | 5/1990 | Weibel et al. |
| H1628 | H * | 1/1997 | Ekanayake ............. A23F 3/163 426/597 |
| 5,964,983 | A | 10/1999 | Dinand et al. |
| 6,180,159 | B1 | 1/2001 | Villagran et al. |
| 6,485,767 | B1 | 11/2002 | Cantiani et al. |
| 6,673,384 | B1 | 1/2004 | Villagran et al. |
| 6,758,130 | B2 * | 7/2004 | Sargent ..................... A23F 3/14 426/115 |
| 7,838,666 | B2 | 11/2010 | Yaginuma et al. |
| 2003/0059514 | A1 | 3/2003 | Villagran et al. |
| 2003/0228393 | A1 | 12/2003 | Zhao |
| 2005/0272836 | A1 | 12/2005 | Yaginuma et al. |
| 2006/0034993 | A1 | 2/2006 | Saelzer |
| 2006/0099277 | A1 | 5/2006 | Jewett, Jr. et al. |
| 2007/0259022 | A1 | 11/2007 | Molhuizen et al. |
| 2008/0050498 | A1 * | 2/2008 | Sherwood ............ A23C 9/1526 426/583 |
| 2009/0022853 | A1 * | 1/2009 | Ten Brink ................. A23L 2/02 426/72 |
| 2009/0041914 | A1 * | 2/2009 | Rosevear ................ A23F 3/163 426/330.3 |
| 2009/0061064 | A1 | 3/2009 | Konda et al. |
| 2009/0155447 | A1 | 6/2009 | Moore et al. |

(Continued)

FOREIGN PATENT DOCUMENTS

CN 1072297 5/1993
CN 1095240 A * 11/1994
(Continued)

OTHER PUBLICATIONS

Dinand E et al, Suspensions of cellulose microfibrils from sugar beet pulp, Food Hydrocolloids, 1999, 275-283XP002251873, 13-3.
(Continued)

*Primary Examiner* — Tamra L. Dicus
(74) *Attorney, Agent, or Firm* — Greenberg Traurig, LLP

(57) ABSTRACT

The invention relates to a tea-based beverage composition comprising, calculated by weight of dry matter: 0.3-10% of dry tea components; 10-80% saccharide selected from sucrose, glucose, fructose and combinations thereof; 2-35% oil; 0.5-20% gelatinized starch; and 0.1-10% plant protein selected from leguminous protein, cereal protein and combinations thereof; wherein the composition contains less than 10% by weight of dry matter of particles of plant material comprising the plant protein wherein said particles having a diameter of more than 10 μm and wherein the gelatinized starch and the plant protein are contained in the beverage composition in a weight ratio of 1:1 to 20:1. The benefits of the invention can be realized in ready-to-drink beverages as well as in reconstitutable powders. The invention also provides a process for the preparation of the aforementioned tea-based beverage composition, the process comprising addition of a flour selected from leguminous flour, cereal flour and combinations thereof.

8 Claims, No Drawings

(56) References Cited

U.S. PATENT DOCUMENTS

| | | | |
|---|---|---|---|
| 2010/0047395 A1 | 2/2010 | Zwicker et al. | |
| 2010/0222439 A1* | 9/2010 | Chen | A23F 3/163 |
| | | | 514/731 |
| 2011/0014347 A1* | 1/2011 | Terazawa | A23F 3/14 |
| | | | 426/597 |
| 2011/0020512 A1 | 1/2011 | Masutake et al. | |
| 2011/0305740 A1 | 12/2011 | Boursier et al. | |
| 2012/0142909 A1 | 6/2012 | Lundberg | |
| 2015/0335040 A1 | 11/2015 | Koppert et al. | |

FOREIGN PATENT DOCUMENTS

| | | |
|---|---|---|
| CN | 1108759 | 9/1995 |
| CN | 100451035 | 1/2009 |
| CN | 101385563 | 3/2009 |
| CN | 101692852 | 4/2010 |
| CN | 101919459 | 12/2010 |
| CN | 101926401 | 12/2010 |
| CN | 102119754 | 7/2011 |
| CN | 102340996 | 2/2012 |
| CN | 102524450 | 7/2012 |
| CN | 103230052 | 8/2013 |
| EP | 0295865 | 12/1988 |
| EP | 0296849 | 12/1988 |
| EP | 1553103 | 7/2005 |
| EP | 2168440 | 3/2010 |
| GB | 1537011 | 12/1978 |
| IN | 01309CH2011 | 10/2012 |
| JP | 6430538 | 2/1989 |
| JP | H08038127 | 2/1996 |
| JP | 11501684 | 2/1999 |
| JP | 2000270783 | 10/2000 |
| JP | 2001029053 | 2/2001 |
| JP | 2001520868 | 11/2001 |
| JP | 2002501733 | 1/2002 |
| JP | 2002526247 | 8/2002 |
| JP | 2003532376 | 11/2003 |
| JP | 2004305005 | 11/2004 |
| JP | 2005525083 | 8/2005 |
| JP | 2005245217 | 9/2005 |
| JP | 2006020579 | 1/2006 |
| JP | 2006020580 | 1/2006 |
| JP | 2006037307 | 2/2006 |
| JP | 2006180830 | 7/2006 |
| JP | 2007330256 | 12/2007 |
| JP | 2008104428 | 5/2008 |
| JP | 2009118821 | 6/2009 |
| JP | 2010004827 | 1/2010 |
| JP | 2012519012 | 8/2012 |
| JP | 2016500270 | 1/2016 |
| TW | 200944130 | 11/2009 |
| WO | WO9831240 | 7/1998 |
| WO | WO9938393 | 8/1999 |
| WO | WO0067749 | 11/2000 |
| WO | WO0124644 | 4/2001 |
| WO | WO0152670 | 7/2001 |
| WO | WO0249451 | 6/2002 |
| WO | WO2009124305 | 10/2009 |
| WO | WO2010056410 | 5/2010 |
| WO | WO2011010368 | 1/2011 |
| WO | WO2011115910 | 9/2011 |
| WO | WO2012089448 | 7/2012 |
| WO | WO2012146777 | 11/2012 |

OTHER PUBLICATIONS

Emmi Emminent, Energy Drink, Mintel GNPD, Sep. 2008, 1-2.

Lipton, Indulgent Milk Tea, Lipton Indulgent Milk Tea 2012 PP1-2, Sep. 18, 2012, pp. 1-2, JP.

Nathalie Lavoine et al, Microfibrillated cellulose—Its barrier properties and applications in cellulosic materials: A review, Carbohydrate Polymers, Jun. 1, 2012, 735-764, 90 No. 2.

Pokka, Roast Tea Latte, Pokka Roast Tea Latte, Sep. 10, 2012, pp. 1-2, JP.

Taro milk tea with five types of beans, Mintel Database GNPD, Sep. 2012 (NPL 1, pp. 1-3).

Aguilera et al., Starch, Functional Properties, and Microstructural Characteristics in Chickpea and Lentil as Affected by Thermal Processing, Journal of Agricultural and Food Chemistry, 2009, 99. 10682-10688, 57, ES (NPL 1, pp. 4-10).

Coco-Cola, Sokenbicha Iced Tea, Database Mintel GNPD, Apr. 2009, pp. 1-2 (NPL 1, pp. 11-12).

Harshadrai M Rawel et al, Determining the binding affinities of phenolic compounds to proteins by quenching of the intrinsic tryptophan fluorescence, Molecular Nutrition & Food Research, Aug. 1, 2006, 705-713, vol. 50 No. 8 (NPL 1, pp. 13-21).

Koiwai Dairy, Azuki Green Tea Au Lait, Database Mintel GNPD, Jan. 2006, pp. 1-2 (NPL 1, pp. 22-23).

Kracie Foods, Green Tea & Azuki Bean Drink, Database Mintel GNPD, Apr. 2004, pp. 1-2 (NPL 1, pp. 24-25).

Nestle, Matcha Green Tea Latte with Rich Azuki, Database Mintel GNPD, Sep 2011, pp. 1-2 (NPL 1, pp. 26-27).

Search Report in EP12198233, May 14, 2013, EP (NPL 1, pp. 28-30).

Search Report in PCTEP2013075221, Feb. 18, 2014 (NPL 1, pp. 31-34).

Sotomayor et al, Lentil Starch Content and it Microscopical Structure as Influenced by Natural Fermentation, Starch Starke, 1999, 152-156, 5, ES (NPL 1, pp. 35-40).

Written Opinion in EP12198233, May 14, 2013, EP (NPL 1, pp. 41-46).

Written Opinion in PCTEP2013075221, Feb. 18, 2014 (NPL 1, pp. 47-56).

Zhen Ma et al, Thermal processing effects on the functional properties and microstructure of lentil chickpea and pea flours, Elsevier, Dec. 6, 2010, 2534-2544, vol. 44 No. 8 (NPL 1, pp. 57-67).

* cited by examiner

TEA DRY MATTER COMPOSITIONAL BEVERAGE

TECHNICAL FIELD OF THE INVENTION

The present invention relates to a tea-based beverage, more particularly a cloudy tea-based beverage containing a dispersed oil phase.

The tea-based beverage of the present invention comprises dry tea components, saccharide, oil, gelatinized starch and plant protein selected from leguminous protein, cereal protein and combinations thereof. The beverage of the present invention may be in ready-to-drink liquid form or in the form of a reconstitutable powder.

The ready-to-drink tea-based beverage of the present invention combines high emulsion stability with a very pleasant, creamy mouthfeel.

The present invention also provides a process for the preparation of the aforementioned tea-based beverage composition.

BACKGROUND OF THE INVENTION

Tea is an aromatic beverage commonly prepared by pouring hot or boiling water over cured leaves of the tea plant, *Camellia sinensis*. After water, tea is the most widely consumed beverage in the world.

Many teas are traditionally drunk with milk in cultures where dairy products are consumed. These include Indian masala chai and British tea blends. These teas tend to be very hearty varieties of black tea, which can be tasted through the milk. Milk is thought to neutralize remaining tannins and reduce acidity.

Other popular additives to tea by the tea-brewer or drinker include sugar, liquid honey or a solid Honey Drop, agave nectar, fruit jams, lemon slices and mint.

CN 102119754 describes a gingko milk tea which comprises: 20-60 wt. % of gingko powder, 10-30 wt. % of green tea powder, 10-20 wt. % of whole milk powder, 10-15 wt. % of white granulated sugar and 0.5-10 wt. % of vegetable fat.

For the convenience of the consumer, bottled or canned ready-to-drink beverages that combine tea, milk and sugar have been introduced into the market. Also, instant tea products, which upon reconstitution with water, give a beverage similar to tea with milk, have been made commercially available.

EP-A 0 296 849 describes a particulate instant tea product comprising:
a) 2-25 wt. % fat;
b) 5-25 wt. % proteinaceous material;
c) 10-40 wt. % hydrolysed starch;
d) 10-40 wt. % tea solids;
e) 0-10 wt. % water
f) 0-30 wt. % milk sugar.

US 2007/259022 describes a composition comprising at least 0.001 mg/g statin wherein the composition is a particulate comprising a matrix material in an amount of 10-70 wt % and fatty matter dispersed in the matrix material, wherein the combined amount of fatty matter and statin is 30-90 wt %, and wherein the matrix material comprises protein or a carbohydrate or a combination thereof. Example 10 of the US patent application describes an instant composition for a creamy milk tea containing 52% sugar, 42% creamer, 5% black tea powder and 1% black tea flavour. The creamer contains 55% oil, 13% sodium caseinate, 10% lactose, 20% maltodextrin and 2% disodium phosphate.

US 2011/305740 describes a granulated powder comprising at least one vegetable protein and at least one starch hydrolyzate, wherein said granulated powder has:
a laser volume average diameter $D_{4,3}$ of between 10 μm and 500 μm, and
a dry matter content of greater than 80%. The US application also mentions an oil/water, and preferably coffee or tea whitening, emulsion comprising the granulated powder.

SUMMARY OF THE INVENTION

The inventors have developed a ready-to-drink tea-based beverage having a taste and appearance similar to that of an ordinary milk tea product. The tea-based beverage of the present invention—unlike ordinary milk tea—contains gelatinized starch and plant protein selected from leguminous protein, cereal protein and combinations thereof. The inventors have discovered that this particular combination of starch and plant protein can suitably be used as a (partial) replacement for dairy protein and fat in tea-based beverages.

Thus, one aspect of the invention relates to a tea-based beverage composition comprising, calculated by weight of dry matter:
  0.3-10% of dry tea components;
  10-80% saccharide selected from sucrose, glucose, fructose and combinations thereof;
  2-35% oil;
  0.5-20% gelatinized starch; and
  0.1-10% plant protein selected from leguminous protein, cereal protein and combinations thereof;
wherein the composition contains less than 10% by weight of dry matter of particles of plant material comprising the plant protein wherein said particles having a diameter of more than 10 μm and wherein the gelatinized starch and the plant protein are contained in the beverage composition in a weight ratio of 1:1 to 20:1.

The inventors have found that the benefits of the present invention can be realized in ready-to-drink beverages as well as in reconstitutable powders. Thus, besides a ready-to-drink beverage, the present invention also provides a tea-based reconstitutable beverage powder.

Although the inventors do not wish to be bound by theory, it is believed that the present combination of starch and plant protein provides a creamy mouthfeel to the tea-based beverage because it enhances the velvety or soft perception in the mouth and increases viscosity of the beverage and because the plant protein is capable of complexing tea-catechins present in the beverage, thereby reducing astringency.

The invention also provides a process for the preparation of a tea-based beverage composition, said process comprising the addition of a flour selected from leguminous flour, cereal flour and combinations thereof.

DETAILED DESCRIPTION OF THE INVENTION

Accordingly, the present invention provides a tea-based beverage composition comprising, calculated by weight of dry matter:
  0.3-10% of dry tea components;
  10-80% saccharide selected from sucrose, glucose, fructose and combinations thereof
  2-35% oil;
  0.5-20% gelatinized starch; and
  0.1-10% plant protein selected from leguminous protein, cereal protein and combinations thereof;

wherein the composition contains less than 10% by weight of dry matter of particles of plant material comprising the plant protein wherein said particles having a diameter of more than 10 μm and wherein the gelatinized starch and the plant protein are contained in the beverage composition in a weight ratio of 1:1 to 20:1.

The term "dry tea components" refers to dry matter that is derived from tea leaves of the tea plant, *Camellia sinensis*. Examples of dry tea components include polyphenols, caffeine and amino acids.

The term "starch" as used herein, unless indicated otherwise, refers to native, non-modified, starch. Starch consists of two types of molecules: the linear and helical amylose and the branched amylopectin.

The term "gelatinized starch" as used herein refers to starch that has undergone gelatinization. Starch gelatinization is a process that breaks down the intermolecular bonds of starch molecules in the presence of water and heat, allowing the hydrogen bonding sites to engage more water. This irreversibly dissolves the starch granule. Penetration of water increases randomness in the general starch granule structure and decreases the number and size of crystalline regions. Under the microscope in polarized light, starch loses its birefringence and its extinction cross during gelatinization. Some types of unmodified native starches start swelling at 55° C., other types at 85° C. The gelatinization temperature depends on the degree of cross-linking of the amylopectin.

The term "protein" as used herein refers to a linear polypeptide comprising at least 10 amino acid residues. Preferably, said protein contains more than 20 amino acid residues. Typically, the protein contains not more than 35,000 amino acid residues.

The term "leguminous protein" as used herein refers to protein originating from legumes.

The term "legumes" as used herein refers to plant in the family Fabaceae (or Leguminosae), or a fruit of these specific plants. A legume fruit is a simple dry fruit that develops from a simple carpel and usually dehisces (opens along a seam) on two sides. A common name for this type of fruit is a pod, although the term "pod" is also applied to a few other fruit types, such as vanilla and radish. Well-known legumes include pulses, lupins and soybeans.

The term "pulse" as used herein refers to an annual leguminous crop yielding from one to twelve seeds of variable size, shape, and colour within a pod and is reserved for crops harvested solely for the dry seed. This excludes fresh green beans and fresh green peas, which are considered vegetable crops. Also excluded are crops that are mainly grown for oil extraction (oilseeds like soybeans and peanuts), and crops which are used exclusively for sowing (clovers, alfalfa). Just like words such as "bean" and "lentil", the word "pulse" may also refer to just the seed, rather than the entire plant.

The term "cereal protein" refers to protein originating from cereal grain.

The term "cereal" as used herein refers to grasses (notably members of the monocot family Poaceae) cultivated for the edible components of their grain, composed of the endosperm, germ, and bran.

The term "oil" as used herein refers to lipids selected from the group of triglycerides, diglycerides, monoglycerides, phospholipids and free fatty acids. The term "oil" encompasses lipids that are liquid at ambient temperature as well as lipids that are partially or wholly solid at ambient temperature.

The term "sugars" as used herein refers to mono- and disaccharides.

The term "dietary fiber" as used herein refers to indigestible non-starch polysaccharides such as arabinoxylans, cellulose, lignin, pectins and beta-glucans.

The term "flour" as used herein refers to a finely ground seed or a finely ground cereal grain. The flour is suitably produced by milling or grinding dehulled or non-dehulled seeds or grain. The seeds or grains may be milled or ground as such, or they may be milled or ground in the presence of water, e.g. to produce an aqueous slurry or paste.

The term "diameter" as used herein in relation to particles of plant material that are contained in the beverage composition, refers to the diameter as determined with the help of sieves.

The term "diameter" as used herein in relation to the particles and oil droplets that are contained in a ready-to-drink beverage, unless otherwise specified, refers to the diameter as determined with the help of a laser diffraction instrument, e.g. Malvern Mastersizer.

The tea-based beverage composition of the present invention typically contains 0.5-6%, more preferably 1-4% and most preferably 2-3% dry tea components by weight of dry matter.

The dry tea components contained in the beverage composition provide a considerable amount of theanine. Typically, the beverage composition contains at least 50 mg theanine per kg of dry matter. Even more preferably the composition contains 100-800 mg, most preferably 200-600 mg theanine per kg of dry matter.

The dry tea components contained in the tea-based beverage composition are preferably derived from black tea, oolong tea, white tea or green tea. More preferably, the dry tea components are derived from black tea or oolong tea. Most preferably, the dry tea components are derived from black tea. Black tea, unlike green tea, contains a substantial amount of theaflavins. Typically, the beverage composition contains at least 50 mg theaflavins per kg of dry matter. Even more preferably the composition contains 100-1000 mg, most preferably 150-500 mg theaflavins per kg of dry matter.

According to another preferred embodiment, the dry tea components are provided by tea powder.

The tea-based beverage composition typically contains 20-75% by weight of dry matter, most preferably 30-65% by weight of dry matter of saccharide selected from sucrose, glucose, fructose and combinations thereof. Preferably, the saccharide is sucrose.

The oil content of the beverage composition preferably is within the range of 1 to 25%, most preferably 2-15% by weight of dry matter.

The oil employed in the present method typically contains 50-100 wt. %, more preferably 70-100 wt. % and most preferably 90-100 wt. % of triglycerides. The oil advantageously contains a high level of unsaturated fatty acids. Typically, 40-100 wt. %, more preferably 50-100 wt. % and most preferably 60-100 wt. % of the fatty acids contained in the oil are unsaturated fatty acids. The melting point of the oil typically does not exceed 30° C., more preferably it does not exceed 20° C. and most preferably it does not exceed 10° C.

Gelatinized starch typically constitutes 0.7-18%, more preferably 0.8-15% and most preferably 1-12% by weight of the dry matter contained in the tea-based beverage composition.

In accordance with a preferred embodiment, the gelatinized starch and the plant protein are contained in the tea-based beverage composition in a weight ratio of 5:4 to 20:1, more preferably of 4:3 to 10:1 and most preferably of 3:2 to 3:1.

The beverage composition of the present invention preferably contains 0.2-8%, more preferably 0.4-6% and most preferably 0.6-5% of the plant protein by weight of the dry matter contained in the composition.

Of the plant protein (leguminous and/or cereal protein) comprised in the present beverage composition preferably at least 10 wt. % of is water-soluble. Even more preferably, at least 20 wt. % of the plant protein is water-soluble and most preferably at least 30 wt. % is water-soluble. Here water solubility is determined in demineralized water at a plant protein concentration of 5 wt. %, a temperature of 20° C. and a pH of 7.

Examples of leguminous proteins that may suitably be employed in the present beverage composition include pulse protein (e.g. protein from lentil, cow pea, adzuki, chick pea, mung bean or guar bean), soy protein, lupin protein and combinations thereof. Preferably, the leguminous protein is pulse protein, more preferably pulse protein selected from lentil protein, pea protein, bean protein and combinations thereof. Even more preferably, the leguminous protein is selected from lentil protein, chickpea protein, yellow pea protein, mung bean protein and combinations thereof. Most preferably, the leguminous protein is lentil protein.

Examples of cereal proteins that may suitably be employed in the beverage composition include rice protein, corn/maize protein, wheat protein, millet protein, and combinations thereof.

Preferably, the plant protein employed in the beverage composition is a leguminous protein.

According to another preferred embodiment the beverage composition contains 0.5-20% dairy protein by weight of dry matter. More preferably, the beverage composition contains 1-15%, most preferably 3-10% by weight of dry matter of dairy protein.

The dry tea components, oil, gelatinized starch, plant protein and saccharide together typically constitute at least 80 wt. % of the dry matter contained in the beverage composition. Even more preferably, the latter ingredients constitute at least 85 wt. %, most preferably at least 90 wt. % of the dry matter contained in the beverage.

The tea-based beverage composition typically contains not more than a small amount of insoluble matter other than oil. Typically, the beverage composition contains less than 20%, more preferably less than 10% by weight of dry matter of insoluble matter other than oil. Most preferably, the beverage composition contains less than 5% by weight of dry matter of insoluble matter other than oil.

According to a particularly preferred embodiment at least a part of the starch and plant protein contained in the beverage composition originate from the same plant material (pulse or cereal grain). Preferably, at least 20 wt. % of the gelatinized starch and at least 20 wt. % of the plant protein originate from the same plant material. Even more preferably, at least 50 wt. % of the gelatinized starch and at least 50 wt. % of the plant protein originate from the same plant material. Most preferably, at least 80 wt. % of the gelatinized starch and at least 80 wt. % of the plant protein originate from the same plant material.

According to a particularly preferred embodiment the starch and plant protein contained in the beverage composition are at least partly provided by a flour selected from leguminous flour, cereal flour and combinations thereof. More preferably, the composition contains 0.7-25% by weight of dry matter, even more preferably 2-20% by weight of dry matter and most preferably 5-15% by weight of dry matter of flour selected from leguminous flour, cereal flour and combinations thereof.

The flour contained in the beverage composition is preferably selected from the group consisting of pulse flour (e.g. flour from lentil, cow pea, adzuki, chick pea, mung bean or guar bean), rice flour, soy flour, wheat flour, millet flour, maize flour and combinations thereof. More preferably, the flour contained in the beverage is pulse flour, even more preferably a pulse flour selected from lentil flour, pea flour, bean flour and combinations thereof. Even more preferably, the flour is selected from lentil flour, chickpea flour, yellow pea flour, mung bean flour and combinations thereof. Most preferably, the flour is lentil flour.

In accordance with one embodiment of the present invention the beverage composition is a ready-to-drink beverage. Typically, the ready-to-drink beverage contains at least 75-97 wt. % water, more preferably 80-96 wt. % water and most preferably 85-95 wt. % water.

The amount of dry tea components contained in the ready-to-drink beverage typically lies in the range of 0.3-8 wt. %, more preferably in the range of 0.6-6 wt. % and most preferably in the range of 1.0-4 wt. %.

The ready-to-drink beverage of the present invention typically has a viscosity at 35° C. and 50 $s^{-1}$ of 1-50 mPa·s. More preferably, the latter viscosity is in the range of 2-25 mPa·s, most preferably in the range of 3-15 mPa·s.

According to another preferred embodiment, the ready-to-drink beverage exhibits Newtonian behavior.

Yet another embodiment of the beverage composition is a reconstitutable powder. Typically, the reconstitutable powder has a mass weighted average diameter in the range of 20-500 μm, more preferably of 30-300 μm, most preferably of 40-250 μm.

Typically, one part by weight of the reconstitutable powder can be combined with 5-15 parts by weight of hot water to prepare a ready-to-drink beverage as defined herein before.

A further aspect of the present invention relates to process of preparing a tea-based beverage composition as defined herein, said process comprising adding a flour selected from leguminous flour, cereal flour and combinations thereof.

The flour employed in the present process can be added in the form of a dry powder or in the form of an aqueous slurry.

Preferably, the preparation process comprises the addition of tea powder. Even more preferably, the process also comprises the addition of saccharide in the form of a powder.

The starch content of the flour employed in the present process preferably lies in the range of 20% to 80%, more preferably in the range of 25 to 75% and most preferably in the range of 30% to 60% by weight of dry matter. The protein content of the flour typically lies in the range of 5-50%, more preferably 7-38% and most preferably of 10-35% by weight of dry matter.

The flour typically contains starch and protein in a weight ratio of 1:2 to 5:1, more preferably of 2:3 to 3:1 and most preferably of 1:1 to 5:2.

Typically, the flour employed in accordance with the present invention contains less than 25%, most preferably less than 20% of dietary fiber by weight of dry matter.

The oil content of the flour preferably lies in the range of 0.8-8 wt. %.

According to a particularly preferred embodiment, the flour has the following composition, calculated on dry matter:

30-60 wt. % of starch;

1-40 wt. % of dietary fiber;
0.5-12 wt. % of sugars;
15-35 wt. % of protein;
0.8-12 wt. % of oil.

Typically, starch, dietary fiber, sugars, protein and oil together make up 90-100 wt. %, more preferably 95-100 wt. % of the dry matter contained in the flour.

Examples of leguminous flours that may suitably be employed in the present beverage composition include pulse flour, soy flour and combinations thereof. Preferably, the leguminous flour is pulse flour, more preferably pulse flour selected from lentil flour, pea flour, bean flour and combinations thereof. Even more preferably, the leguminous flour is selected from lentil flour, chickpea flour, yellow pea flour, mung bean flour and combinations thereof. Most preferably, the leguminous flour is lentil flour.

Examples of cereal flours that may suitably be employed in the beverage composition include rice flour, corn flour and combinations thereof.

Preferably, the plant flour employed in the beverage composition is a leguminous flour.

The invention is further illustrated by means of the following non-limiting examples.

EXAMPLES

Example 1

Ready-to-drink tea-based beverages were prepared in a tea cup on the basis of the recipes depicted in Table 1.

TABLE 1

| Ingredient | A | Control |
|---|---|---|
| Water | 148.2 g | 150 g |
| Lentil flour | 1.8 g | — |
| Sugar | 10.5 g | 10.5 g |
| Non-dairy Creamer[1] | 3.15 g | 3.15 g |
| Milk Powder | 2.8 g | 2.8 g |
| Maltodextrin | 0.35 g | 0.35 g |
| CMC | 0.13 g | 0.13 g |
| Black Tea Powder | 0.45 g | 0.45 g |
| Flavour | 0.10 g | 0.10 g |

[1]Contains 30-40% oil; 2% milk protein, and 50-60% carbohydrates

The tea beverages were prepared as follows:
Lentil flour (milled & sieved to <200 micron) was added to cold water (4 parts flour and 96 parts water) and hand whisked to disperse the flour throughout the water
The mixture was heated to 90° C. in a water-bath and was kept at this temperature for 30 minutes while mixing with an Ultra Turrax at a high shear of approx. 13,500 rpm to produce a slurry
The dry ingredients (except for the lentil flour) were poured into a tea cup
Boiling water (105 ml) was poured into the cup
The contents of the cup were stirred with a spoon
The previously prepared lentil slurry (45 g) was added while hot into the cup
The contents of the cup were stirred with a spoon
An expert sensory panel evaluated the hot, freshly prepared beverages using a set of attributes several of which were related to different aspects of 'creaminess'. The results showed that in comparison to the control product, the product with lentil slurry had a more intense mouthfeel, increased thickness and increased creamy taste.

Example 1a

Ready-to-Drink Tea-Based Beverages were Prepared in a Tea Cup on the Basis of the Recipes Depicted in Table 1a TABLE 1a

| Ingredient | B | C |
|---|---|---|
| Water | 148.2 g | 148.2 g |
| Lentil flour | Starch fraction | Protein fraction |
| Sugar | 10.5 g | 10.5 g |
| Non-dairy Creamer[1] | 3.15 g | 3.15 g |
| Milk Powder | 2.8 g | 2.8 g |
| Maltodextrin | 0.35 g | 0.35 g |
| CMC | 0.13 g | 0.13 g |
| Black Tea Powder | 0.45 g | 0.45 g |
| Flavour | 0.10 g | 0.10 g |

The samples were prepared in the same way as described in example 1. One sample containing only the starch (water insoluble) fraction of the lentil flour (sample B) and one sample containing the protein fraction (water soluble) of the lentil flour.

The starch and protein fractions were obtained by mixing lentil flour in water. The pH was increased to 9.5. After overnight stirring the sample was centrifuged. The supernatant contains the proteins and the pellet contains the starch. After adjusting the pH to neutral the starch fraction was cooked as described before while the protein fraction was used as is. Milk teas were prepared as in example 1. The starch or protein level in samples B and C were the same as in sample A.

A sensory panel evaluated the hot, freshly prepared beverages. The results showed that the control was perceived least creamy, sample B and C were perceived as more creamy than the control, and sample A was perceived as being the most creamy, showing that both the protein and starch is required for optimum creaminess.

Example 2

Example 1 was repeated except that this time lentil flour was added in the form of pre-gelatinized lentil flour as part of the dry ingredients. The pre-gelatinized flour had been prepared by spray drying a pre-gelatinized lentil slurry that had been cooked at 90° C. After the dry ingredients had been introduced into the tea cups, boiling water was added and the contents of the cup were well stirred with a spoon.

A sensory panel evaluated the hot, freshly prepared beverages. The results showed that in comparison to the control product, the product with pre-treated lentil flour had a more intense mouthfeel, increased thickness and increased creamy taste.

Example 3

Example 1 was repeated, except that besides lentil flour also the following flours were tested, using identical quantities of these flours:
corn flour
rice flour
yellow pea flour The creaminess of the hot beverages was scored by an expert panel (n=7). All the flour containing samples were ranked as being more creamy than the control.

The viscosity of the tea beverage was measured in a MCR301 rheometer (Anton Paar, Austria) using a plate-plate configuration. The top plate diameter was 5 cm and the gap 1 mm. The viscosity was measured at shear rates from 0.1 to 1000 s$^{-1}$ and reverse, at 35° C. (in mouth temperature). The results obtained are depicted in Table 2.

TABLE 2

| | Viscosity (mPa · s) at 50 s−1 |
|---|---|
| Control | 3.7 |
| Lentil flour | 5.9 |
| Yellow pea flour | 6.7 |
| Rice flour | 10.4 |
| Corn Flour | 12 |

Example 4

Beverages were prepared in the same way as described in Example 1. In addition, beverages were prepared wherein lentil flour was replaced by corn starch (and water) or a combination of corn starch and vegetable protein (and water). Corn starch and vegetable protein were added in quantities that corresponded to the amount of starch and protein provided in the beverage by the lentil flour.

The proteins tested were rice protein, soy protein, pea protein and red lentil protein.

The creaminess of the hot, freshly prepared beverages was ranked by an expert panel (n=7). Compared to the beverage containing corn starch without vegetable protein, all samples containing corn starch in combination with vegetable protein as well as the sample containing lentil flour were ranked as being more creamy.

Viscosity measurements using the methodology described above produced the results depicted in Table 3.

TABLE 3

| | Viscosity (mPa · s) at 50 s$^{-1}$ |
|---|---|
| Corn starch | 10 |
| Corn starch and soy protein | 9.1 |
| Corn starch with pea protein | 7.1 |
| Corn starch with rice protein | 11 |
| Lentil flour | 6.7 |

Example 5

The interaction between plant protein (leguminous proteins and cereal proteins) and catechins was examined. Black tea powder (1.34 g) was dispersed into 500 ml boiling water and the tea so prepared was filtered over a paper filter (Schleicher and Schuell, folded filter) to remove tea particles.

Plant protein isolates (0.3 g) and corn starch (0.9 g) were mixed into 100ml tea extract as powder and heated to about 90° C. for about 5 min while stirring. The tea extract and protein starch mixtures were subsequently filtered hot (70° C.) over a Pall Life sciences 5 micrometer Supor syringe filter. Clear filtrate was collected and diluted 100×. Absorption spectra were measured in a Spectrophotometer. The absorption observed at 275 nm is indicative of the phenolic content of the tea samples.

Table 4 shows the results obtained from the absorption spectra analysis.

TABLE 4

| | Absorption at 275 nm (AU) |
|---|---|
| Black tea extract (BTE) | 0.338 |
| BTE & corn starch | 0.325 |
| BTE & corn starch with pea protein | 0.270 |
| BTE & corn starch with rice protein | 0.196 |
| BTE & corn starch with soy protein | 0.305 |
| BTE & lentil flour | 0.199 |

Absorption is in absorption units (AU), which is linearly proportional concentration of tea phenolics at 275 nm The lowering in absorption observed in the samples containing plant protein shows that there was an interaction between these proteins and the tea phenolics.

The invention claimed is:

1. A tea beverage composition comprising, calculated by weight of dry matter:
   0.3-10% of dry tea components;
   30% to 65% saccharide selected from sucrose, glucose, fructose and combinations thereof
   2-35% oil;
   0.5-20% gelatinized starch; and
   0.1-10% plant protein selected from leguminous protein, cereal protein and combinations thereof;
   wherein the tea beverage composition contains less than 10% by weight of dry matter of particles of plant material comprising the plant protein wherein said particles having a diameter of more than 10 μm and wherein the gelatinized starch and the plant protein are contained in the tea beverage composition in a weight ratio of 4:3 to 10:1;
   wherein the tea beverage composition has a viscosity at 35° C. and 50 s$^{-1}$ of 1-50mPa·s.

2. The tea beverage composition according to claim 1, wherein the dry tea components, oil, gelatinized starch, plant protein and saccharide together constitute at least 80 wt. % of the dry matter contained in the tea beverage composition.

3. The tea beverage composition according to claim 1, wherein the tea beverage composition contains at least 50 mg theanine per kg of dry matter.

4. The tea beverage composition according to claim 1, wherein the tea beverage composition contains less than 10% by weight of dry matter of an insoluble matter other than oil.

5. The tea beverage composition according to claim 1, wherein the tea beverage composition contains 0.5-20% by weight of dry matter of dairy protein.

6. The tea beverage composition according to claim 1, wherein the tea beverage composition contains 0.7-25% by weight of dry matter of flour, the flour selected from lentil flour, pea flour, and combinations thereof.

7. The tea beverage composition according to claim 1, wherein the tea beverage composition is a ready-to-drink beverage.

8. The tea beverage composition according to claim 7, wherein the tea beverage composition contains 75-97 wt % water.

* * * * *